United States Patent
Werner

(10) Patent No.: US 10,891,569 B1
(45) Date of Patent: Jan. 12, 2021

(54) DYNAMIC TASK DISCOVERY FOR WORKFLOW TASKS

(71) Applicant: Amazon Technologies, Inc., Reno, NV (US)

(72) Inventor: Justin Lee Werner, Federal Way, WA (US)

(73) Assignee: Amazon Technologies, Inc., Seattle, WA (US)

( * ) Notice: Subject to any disclaimer, the term of this patent is extended or adjusted under 35 U.S.C. 154(b) by 864 days.

(21) Appl. No.: 14/153,861

(22) Filed: Jan. 13, 2014

(51) Int. Cl.
 *G06Q 10/06* (2012.01)
 *G06F 8/71* (2018.01)

(52) U.S. Cl.
 CPC ......... *G06Q 10/06316* (2013.01); *G06F 8/71* (2013.01)

(58) Field of Classification Search
 None
 See application file for complete search history.

(56) References Cited

U.S. PATENT DOCUMENTS

| | | | | |
|---|---|---|---|---|
| 7,805,327 | B1 * | 9/2010 | Schulz | G06Q 10/06316 705/7.26 |
| 7,882,497 | B2 * | 2/2011 | Nanivadekar | G06F 8/34 703/27 |
| 8,752,030 | B1 * | 6/2014 | Chen | G06Q 10/0633 705/7.12 |
| 9,595,014 | B1 * | 3/2017 | Vohra | G06Q 10/10 |
| 2003/0018543 | A1 * | 1/2003 | Alger | G06Q 30/06 705/26.1 |
| 2003/0135384 | A1 * | 7/2003 | Nguyen | G06Q 10/10 705/301 |
| 2004/0249867 | A1 * | 12/2004 | Kraiss | G06F 9/44536 |
| 2006/0074730 | A1 * | 4/2006 | Shukla | G06Q 10/06 705/7.27 |
| 2006/0277089 | A1 * | 12/2006 | Hubbard | G06Q 10/06 705/7.13 |
| 2006/0282509 | A1 * | 12/2006 | Kilian | H04L 67/2814 709/217 |

(Continued)

OTHER PUBLICATIONS

Archived Web Site "What is AWS Flow Framework (Java)?—AWS Flow Framework." Retrieved from the Internet <URL: http://web.archive.org/web/20121219135855/https://docs.aws.amazon.com/annazonswf/latest/awsflowguide/welconne.html> on May 4, 2020. Archived on Dec. 29, 2012.*

(Continued)

*Primary Examiner* — Susanna M. Diaz
(74) *Attorney, Agent, or Firm* — Robert C. Kowert; Kowert, Hood, Munyon, Rankin & Goetzel, P.C.

(57) ABSTRACT

Dynamic task discovery may be implemented for performing workflow tasks. Input may be received from a workflow engine via static interface upon which a task may be performed that is part of a workflow. A version of the task may be dynamically determined according to dynamic task configuration data. The discovered version of the task may be performed and output notification of completion may be sent to the workflow engine. In some embodiments, the dynamic configuration for a task may be modified such that one performance of the task in a workflow may be according to a different version of the task than another performance the same task in the same workflow. In some embodiments, task templates with dynamically discoverable tasks may be generated by a workflow engine service in order to be implemented as tasks in a workflow.

20 Claims, 9 Drawing Sheets

(56) References Cited

U.S. PATENT DOCUMENTS

| | | | |
|---|---|---|---|
| 2007/0150329 A1* | 6/2007 | Brook | G06Q 10/06 705/7.13 |
| 2007/0266384 A1* | 11/2007 | Labrou | G06F 8/00 718/100 |
| 2008/0040176 A1* | 2/2008 | Ehling | G06Q 30/00 705/302 |
| 2008/0201568 A1* | 8/2008 | Quinn | G06F 9/44521 713/1 |
| 2008/0276231 A1* | 11/2008 | Huang | G06F 8/71 717/145 |
| 2008/0301637 A1* | 12/2008 | Stark | G06F 9/44526 717/120 |
| 2008/0301698 A1* | 12/2008 | Badaloo | G06Q 10/06 718/107 |
| 2008/0301711 A1* | 12/2008 | Stark | G06F 8/315 719/316 |
| 2009/0043634 A1* | 2/2009 | Tisdale | G06F 19/327 705/2 |
| 2009/0049005 A1* | 2/2009 | Van Wart | G06Q 10/06 |
| 2009/0241117 A1* | 9/2009 | Dasgupta | G06F 9/5038 718/101 |
| 2010/0325109 A1* | 12/2010 | Bai | G06F 17/3069 707/737 |
| 2012/0102485 A1* | 4/2012 | Goldman | G06F 8/64 717/176 |
| 2012/0173490 A1* | 7/2012 | Gould | G06F 11/1474 707/648 |
| 2012/0209655 A1* | 8/2012 | Ramachandran | G06Q 10/06 705/7.27 |
| 2012/0304160 A1* | 11/2012 | Soeder | G06F 9/4486 717/148 |
| 2013/0226671 A1 | 8/2013 | Pechanec et al. | |
| 2014/0019983 A1* | 1/2014 | Rassin | G06F 8/20 718/102 |
| 2014/0096107 A1* | 4/2014 | Ravel | G06F 8/70 717/107 |
| 2014/0222493 A1* | 8/2014 | Mohan | G06Q 10/06316 705/7.26 |
| 2015/0172140 A1* | 6/2015 | Habdank | H04L 43/00 709/224 |

OTHER PUBLICATIONS

"3. The IoC Container, Part III. Core Technologies", accessed Aug. 13, 2014, pp. 1-10.

AWS Documentation, "Testability and Dependency Injection", Jan. 25, 2012, pp. 1-6.

AWS Documentation, "What is Amazon Simple Workflow Service", Jan. 25, 2012, 1 page.

* cited by examiner

DYNAMIC TASK DISCOVERY FOR WORKFLOW TASKS

BACKGROUND

The business environment for application providers is highly competitive. Development costs to bring new application services or products to market, as well as investments in maintaining, updating, and refining these applications, may ultimately determine the survival of these application services or products. For example, if a media distribution service provides media content to clients in variety of formats, the media distribution service may need to be updated in order to provide media in the latest formats. Each additional format may include changes to the application infrastructure in order to create, maintain, and provide the additional media format. Such application infrastructure changes may prove costly to implement, especially when coordinating changes across multiple systems in distributed applications. Workflow engines, however, free application providers from implementing some, or all, of the underlying application infrastructure, instead allowing resources to be focused on development that adds additional value (e.g., a new media format) to application services or products.

A workflow engine may direct performance of various tasks to implement application services or products. State information (e.g., for a distributed application) for application services or products, tracking execution of the various tasks of the application services or products, and/or dispatching of tasks to resources to perform tasks of the application services or products may be performed and/or maintained by a workflow engine in order to remove some responsibilities, and thus cost, for developing or adding to the application services or products. Therefore, increasing the capabilities of workflow engines to provide workflow management services for a broad number of application services or products may lead toward greater cost savings and/or more efficient use of development resources for application providers.

Figure 1A:
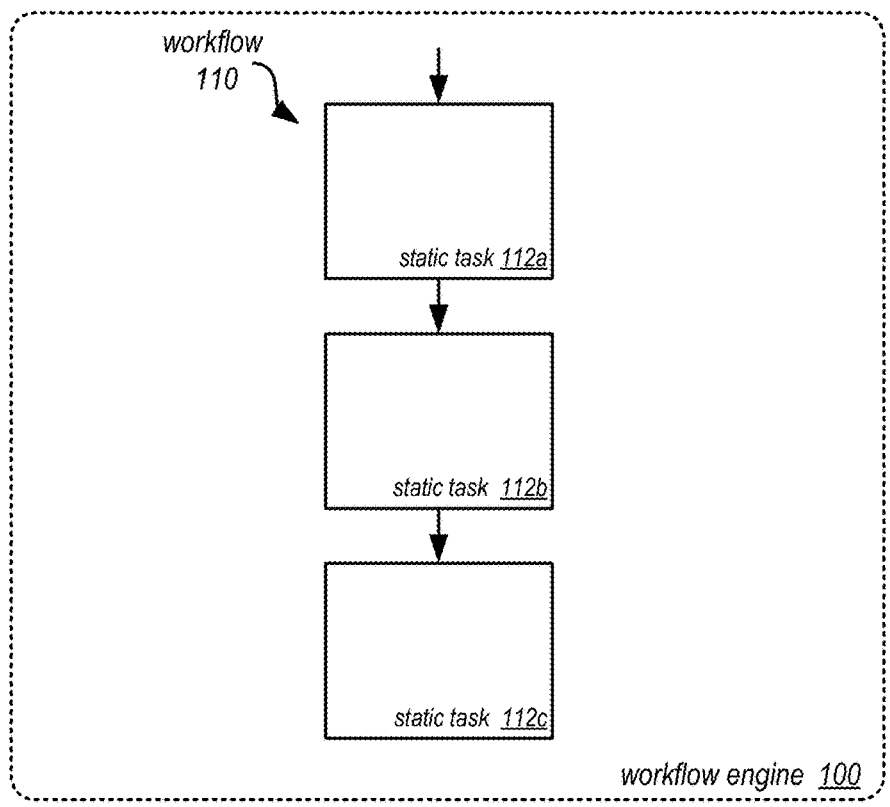
FIG. 1A is a block diagram illustrating a workflow engine managing performance of a workflow with statically-defined workflow tasks, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

The systems and methods described herein may implement dynamic task discovery for workflow tasks, according to some embodiments. Workflow engines may provide various infrastructure services as part of an application, such as a product or service. A workflow for the application may include one or more workflow tasks that provide a service or functionality of the application when performed. For example, a media content provider may utilize a delivery workflow for providing media to customers. The delivery workflow may include multiple tasks that determine a format for purchased media, obtain or generate the purchased media according to the determined format, apply digital rights management controls to the purchased media, determine media transport configuration settings for the purchased media, and send the purchased media to a customer according to the configuration settings.

In various embodiments, some task implementations for workflow tasks may be statically-defined, with the task's implementation (i.e., how it is performed) determined prior to runtime of the task. Statically-defined tasks may utilize the same task implementation (or version) to perform the task in response to input and/or requests from the workflow engine to perform the task. In at least some embodiments, some task implementations may be dynamically discoverable for a task at runtime. For example, in some embodiments an inversion of control mechanism may be implemented to dynamically determine a task implementation (or version of a task) according to a dynamic task configuration. At task runtime, a task version module may be identified via the inversion of control mechanism and loaded to perform the task. Similarly, a data store, such as a database, may be accessed for a dynamic task configuration, in some embodiments, in order to determine the task implementation for a dynamically discoverable task. Once discovered, the task may be performed according to the determined version of the task. In this way, new task versions may be implemented on-the-fly, modifying behavior of the workflow. For example, a task may be performed as part of a workflow with the implementation of the task determined (according to the dynamic task configuration) to be a particular version of the task (e.g., configure an application object received as input to make service requests to service A). Task configuration manager, or some other runtime or dynamic component, may modify the dynamic task configuration used to discover the task version to describe, indicate, point to, or otherwise provide a different task version to be performed such that when the workflow task is performed again, the same task may be performed differently (e.g., configure an application object received as input to make service requests to service B).

In various embodiments, widely varying task versions may be used to perform a task, allowing workflow tasks with dynamic task discovery to achieve higher abstraction than may be the case with statically-defined tasks. It may be the case that workflows which once would have utilized multiple different statically-defined tasks in a more complicated workflow, may instead implement fewer tasks using dynamic task discovery in order to create a simpler workflow that achieves the same functionality. Consider the example of the media content provider delivery workflow presented above. The media format generation step may, in a workflow using statically-defined workflow tasks result in multiple tasks specific to each media format being generated. Implementing a broader media format generation workflow task with dynamic discovery may allow a single workflow task to handle the varying implementations of generating the different media formats. In some embodiments, tasks with dynamic discovery may effectively be skipped for some task performances (e.g., in the media content provider delivery workflow the application of DRM may or may not be performed). For example, in some embodiments, one version of a task may be configured to take no action at all (e.g., a no operation (NOOP)) and simply return output notification of completion.

FIG. 1A is a block diagram illustrating a workflow engine managing performance of a workflow with statically-defined workflow tasks, according to some embodiments. Workflow engine 100 may be implemented by any configuration of hardware and/or software on one or more computing devices, such as computing system 1000 described below with regard to FIG. 9. Workflow engine 100 may maintain state information for currently performing workflows, tracking workflow executions, retaining and ensuring consistency of execution history, and/or dispatching tasks to various task performers/workers, or more generally direct, coordinate, or manage the execution of workflows for clients. Workflow engine 100 may be configured to maintain multiple workflows for one or more clients, as well as multiple versions of workflows.

Workflow 110 may be a workflow registered or created at workflow engine 100 composed of a series of workflow tasks to be performed in order to provide a function, service, or other aspect of an application or service provided by a client of the workflow engine (e.g., an application provider). In the illustrated example work flow 110 includes three static tasks, 112a, 112b, and 112c. Generally, tasks may, in various embodiments, perform different activities or make different decisions as part of performing respective tasks. For example, an activity performed by a task may implement various functional components of the application service (e.g., verify a user, look up an order, etc.). A decision performed by a task may be made with respect to the orchestration of tasks (e.g., when to perform a particular activity for a particular object processed by the workflow), failure handling (e.g., of other tasks), and/or scheduling of other tasks.

In some embodiments, some input (e.g., an object, handle, parameter, reference, pointer, etc. . . . ) may be received in order to perform a task. The task may be performed based upon, using, according to, or with respect to the input, in some embodiments (although the input may simply be an indication to perform the task). A task performer (task worker or task resource), such as a compute node (physical or virtual instance) or other computing system or device, such as computing system 1000 described below with regard to FIG. 9 may be configured to perform a particular task. In some embodiments, a task performer may be configured to perform multiple different tasks of a workflow, such as static tasks 112a, 112b, and 112c.

For each static task 112 illustrated in workflow 110, input may be received and task 112 may be performed according to the static task definition. For example static task 112a, may implement a task to determine a purchased media format for a purchase order passed as input to static task 112a (referring to the media content provider delivery workflow provided above). The implementation of this static task 112a may be described in static task definition that is part of the static task itself (e.g., code performing a "read/parse of item string data to extract the media format") and may be performed for using the same static task definition for each execution of the static task 112a in workflow 110. A static task definition may be a previously compiled executable or code module that is automatically performed in response to receiving input to perform a given static task 112a, in some embodiments. Output generated by static task 112a may be sent to workflow engine 100 and/or a notification may be sent to workflow engine 100 to indicate completion of static task 112a in workflow 110. Although in some embodiments, output may simply be an indication that a task is complete (and may not comprise data or any other product generated by the task). Similarly, input may be received from workflow engine 100 to perform static tasks 112b and 112c according to their respective static task definitions. As noted above, workflows may include many different versions of tasks and employing static tasks may lead to greater numbers of static tasks to be performed in a given workflow.

Figure 1B:
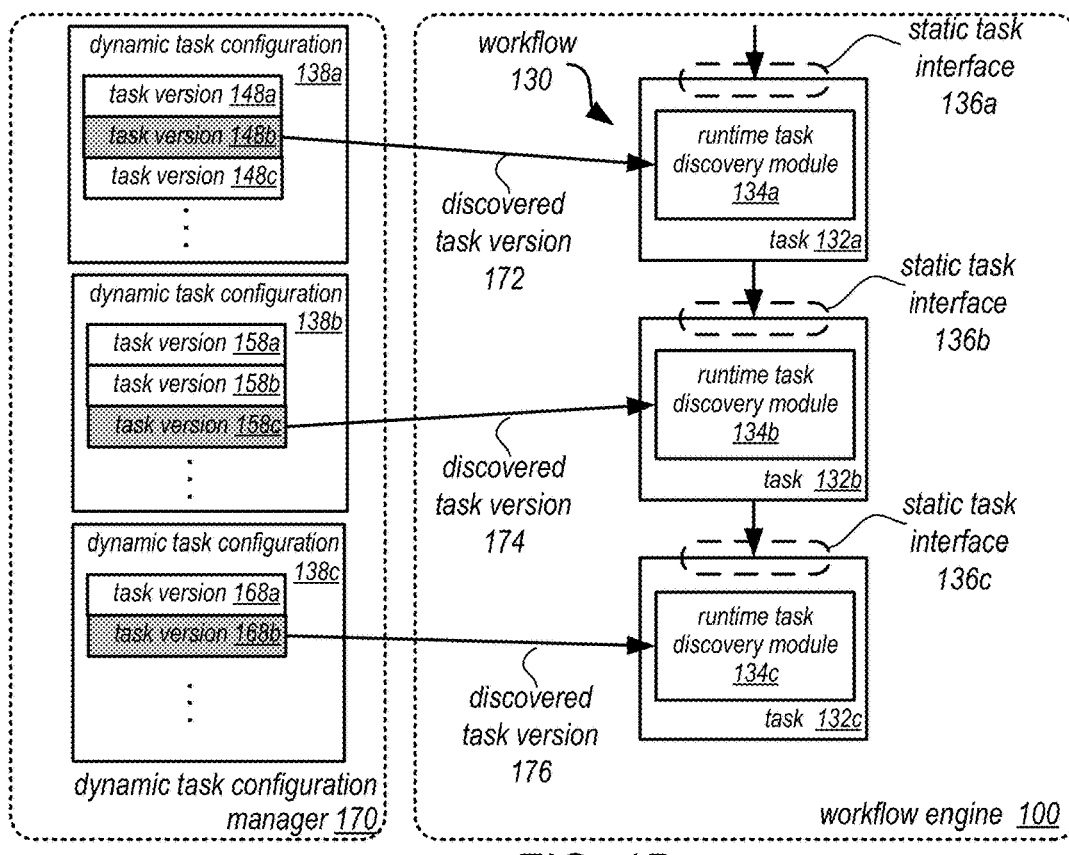
FIG. 1B is a block diagram illustrating a workflow engine managing performance of a workflow with dynamic task discovery for workflow tasks, according to some embodiments.

FIG. 1B is a block diagram illustrating a workflow engine managing performance of a workflow with dynamic task discovery for workflow tasks, according to some embodiments. Workflow engine 100, as described above, may manage, coordinate, or otherwise direct the performance of workflow 130. Workflow 130 may be a workflow registered or created at workflow engine 100 composed of a series of workflow tasks to be performed in order to provide a function, service, or other aspect of an application or service provided by a client of the workflow engine (e.g., an application provider). In the illustrated example workflow 130 includes three tasks, 132a, 132b, and 132c. Tasks may, in various embodiments, perform different activities or make different decisions to as part of performing respective tasks. Input for each of task 132 may be received via a static task interface for the task, such as static task interfaces 136a, 136b, and 136c. A static task interface may be client-defined inputs and/or outputs provided to and sent from a task performing as part of a workflow. Static task interfaces may be defined prior to runtime in the workflow implementation itself (e.g., in a workflow definition, registration, or other information maintained at workflow engine, in some embodiments. Input and/or output may be received and sent via the static task interface without regard to the underlying task version performed using dynamic task discovery.

In various embodiments, each of these tasks, 132*a*, 132*b*, and 132*c*, may be configured to implement a respective runtime task discovery module, such as runtime task discovery modules 134*a*, 134*b*, and 134*c*. Generally, runtime task discovery module 134 may be configured to dynamically determine a version of a respective task 132 to perform according to a dynamic task configuration 138 for the respective task 132. Runtime task discovery module 134 may be implemented as template, placeholder, shim, proxy code, inversion of control mechanism, or other component which may determine a version of a respective task 132 to perform at runtime.

Dynamic task configuration manager 170 may provide, configure, or expose dynamic task configurations 138*a*, 138*b*, and 138*c* to runtime task discovery module 134. Dynamic task configurations 138 may be dynamically configured at runtime (or on-the fly) during workflow performance or as part of some pre-processing decision logic for dynamic task configurations, in various embodiments. For example a task configuration manager 170 may be implemented by the application employing workflow engine 100 and prior to starting a workflow for the application set, modify, or configure dynamic task configuration 138*a* for task 132*a* to correspond with a particular function the workflow 130 is implementing for the application. Alternatively, dynamic task configuration manager 170 may perform runtime or on-the-fly alterations to dynamic task configurations 138. For example, dynamic task configuration may detect a modification event, such as a uniform resource locator (URL) for a particular service utilized by a task version 148*a* is no longer valid, and switch the task version in dynamic task configuration to task version 148*b* (with a valid URL for the service on-the-fly so that subsequent task performances will be exposed to a dynamic configuration 138*a* of the task with that is valid. In some embodiments, dynamic task configuration manager 170 is implemented separately from the location where dynamic task configurations 138 are maintained, and may be configured to perform necessary actions to set, modify, add, delete, etc. . . . the task version provided to a runtime task discovery module 134. Multiple versions for each task may be maintained, in some embodiments, as illustrated by task versions 148*a*, 148*b*, 148*c*, 158*a*, 158*b*, 158*c*, 168*a*, and 168*b*. However, in some embodiments, a single task version may be maintained in dynamic task configuration 138 for a task.

Dynamic task discovery module 134*a* may discover a task version in numerous ways. For example, in some embodiments, dynamic task configurations 138 may be maintained implemented in a data store, such as a database, and runtime task discovery module 134*a* may be configured to read the task version 148*b* from the database in order to discover 172 the task version. In some embodiments, runtime task discovery module may implement some form of proxy code (e.g., inversion of control mechanism such as Spring) that loads a code module based on the dynamic configuration for the task and invokes the code module to perform the task. In some embodiments, dynamic task configurations 138 may be simply a pointer to a code module, executable or other component configured to perform the version of the task, such as by loading, invoking, or otherwise performing the task version. In some embodiments, dynamic task configurations 138 may themselves be executables, modules, or other components configured to perform the version of the task. Dynamic task configurations 138 may be stored/maintained/implemented along with different versions of the same task (e.g., task versions 148*a*, 148*b*, and 148*c*) such as in a task version library, file, etc. . . . . Alternatively, a single task version may be maintained or exposed to dynamic task discovery module 134 and may be set, modified, or reconfigured by dynamic task configuration manager 170 (or other component) to expose a different single task version.

Once runtime discovery task modules 134 have respectively discovered their task versions, 172, 174, and 176, the tasks may be performed according to the discovered task versions upon the input. Output may be generated, and/or a notification sent to workflow engine 100 to indicate completion of the respective tasks 132, in various embodiments.

Please note that previous descriptions are not intended to be limiting, but are merely provided as a logical example of dynamic task discovery for workflow tasks. Various other components or arrangements of components may perform dynamic task configuration management, runtime task discovery, or various other parts of workflow engine performance. Other differences, for example, such as the number or combination (e.g., static and/or dynamic discovery) of tasks may also be different than illustrated in FIGS. 1A and 1B.

This specification begins with a general description of a network-based workflow engine service, which may be used to manage workflow tasks with dynamic task discovery. Then various examples of interactions between a network-based workflow engine service, clients, task performance resources, as well as other network-based services are discussed. A number of different methods and techniques to implement dynamic task discovery for workflow tasks are then discussed, some of which are illustrated in accompanying flowcharts. Finally, a description of an example computing system upon which the various components, modules, systems, devices, and/or nodes may be implemented is provided. Various examples are provided throughout the specification.

Figure 2:
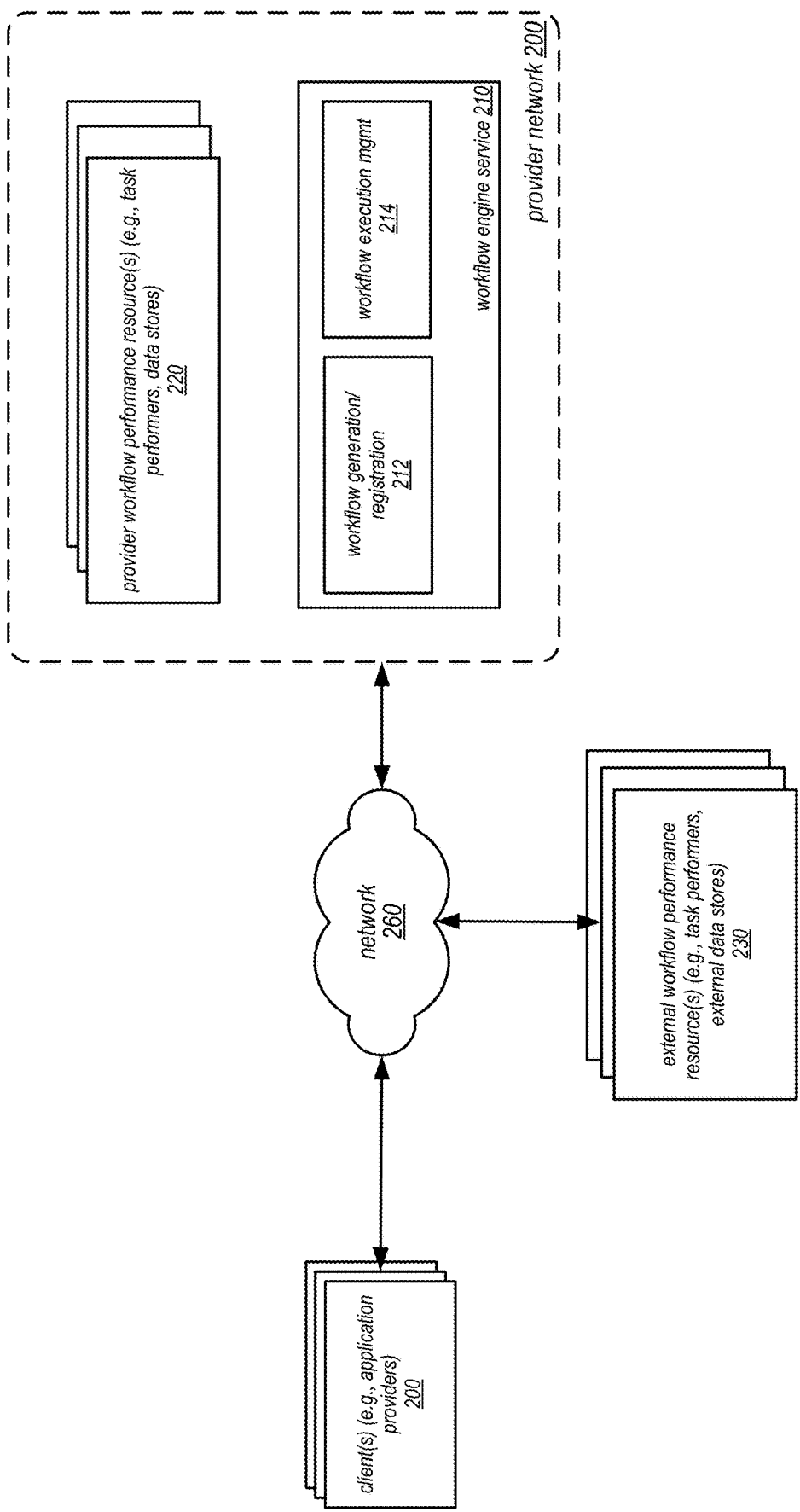
FIG. 2 is a block diagram illustrating a network-based workflow engine service implemented as part of a provider network, according to some embodiments.

FIG. 2 is a block diagram illustrating a network-based workflow engine service implemented as part of a provider network, according to some embodiments. Client(s) 200, such as application providers, may utilize network-based workflow engine service 210 implemented as part of a provider network 200 to manage, coordinate, or otherwise direct performance of workflows performing functions or services for applications, in various embodiments. In some embodiments, external workflow performance resources 230, such as client-owned/controlled computing resources (e.g., application servers), third-party computing resources (e.g., that host application components), data storage systems (e.g., databases), or any other external workflow resource for performing tasks for may also communicate with workflow engine service 210 in order to execute workflows. Provider network 200 may also implement provider workflow performance resources 220 (e.g., compute resources, such as virtual compute instances, data stores, etc. . . . ) for performing workflow tasks to execute workflows, in some embodiments.

Generally speaking, clients 200 may encompass any type of client configurable to submit network-based services requests to workflow engine service 210 via network 260, including requests for workflow engine services (e.g., create/register workflows, start/stop workflow execution, configure workflows, etc. . . . ). For example, a given client 200 may include a suitable version of a web browser, or may include a plug-in module or other type of code module configured to execute as an extension to or within an execution environment provided by a web browser. Alternatively, a client 200 may encompass an application such as an application control panel (or user interface thereof) to interact with workflow engine service 210 (and/or provider network 200). In some embodiments, such an application may include sufficient protocol support (e.g., for a suitable version of Hypertext Transfer Protocol (HTTP)) for generating and processing network-based service requests without necessarily implementing full browser support for all types of network-based data. That is, client 200 may be an application configured to interact directly with workflow engine service 210. In some embodiments, client 200 may be configured to generate network-based services requests according to a Representational State Transfer (REST)-style network-based services architecture, a document- or message-based network-based services architecture, or another suitable network-based services architecture.

In some embodiments, a client 200 (e.g., an application executing workflows using the workflow engine service 210) may be configured to provide access to workflow engine service 210 as a component of (or separate from) an application utilizing workflows in a manner that is transparent to those applications. For example, client 200 may be configured to integrate with a client-side module or driver that interacts with an application using workflow engine service 210 to execute workflows as part of providing application services or functionality as described herein.

Client(s) 200 may convey workflow engine service requests (as well as other service requests) to and receive responses from workflow engine service 210 via network 260. In various embodiments, network 260 may encompass any suitable combination of networking hardware and protocols necessary to establish network-based communications between clients 200 and workflow engine service 210. For example, network 260 may generally encompass the various telecommunications networks and service providers that collectively implement the Internet. Network 260 may also include private networks such as local area networks (LANs) or wide area networks (WANs) as well as public or private wireless networks. For example, both a given client 200 and workflow engine service 210 may be respectively provisioned within enterprises having their own internal networks (e.g., although not illustrated, all provisioned in provider network 200). In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 200 and the Internet as well as between the Internet and workflow engine service 210.

In various embodiments, provider network 200 may include numerous data centers (which may be distributed across different geographical regions) hosting various resource pools, such as collections of physical and/or virtualized computer servers, storage devices, networking equipment and the like, needed to implement, configure and distribute the infrastructure and services offered by the provider. Provider network 200 may implement workflow engine service 210 to provide a workflow engine for client applications in order to manage, coordinate, direct, or execute application workflows that provide application services or functionalities. Provider network 200 may also implement other services (not illustrated) or resources, such as provider workflow performance resource(s) 220, as stand-alone services or resources, or in conjunction with workflow engine service 210.

As noted above, workflow engine service 210 may provide different workflow engines to client(s) 200 in order to execute workflows for client(s) 200. Workflow engine service 210 may be implemented by multiple computing nodes, subsystems, or computing devices, such as computing system 1000 described below with regard to FIG. 9, and thus may be implemented in a distributed fashion. Generally, workflow engine service 210 may be configured to provide (at least from the client's perspective) a dedicated workflow engine to perform client workflows. However, in some embodiments, various forms of multi-tenancy or resource sharing may be implemented among nodes, systems, or devices implementing workflow engine service 210 implementing workflow engines for different clients.

Figure 3:
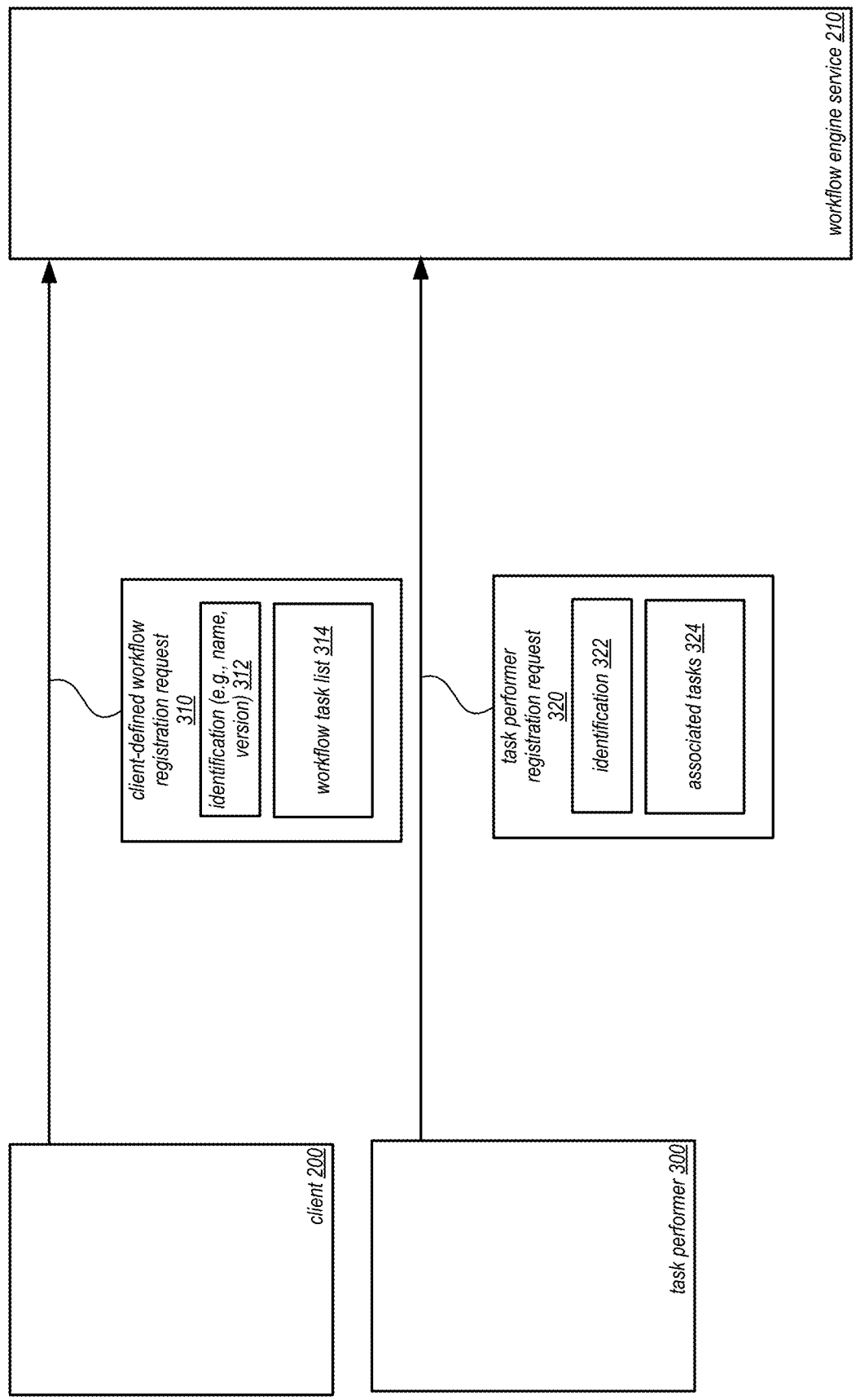
FIG. 3 is a block diagram illustrating interactions between a client and a workflow engine service to register a client-defined workflow and between a task performer and a workflow engine service, according to some embodiments.

Workflow engine service 210 may implement various different components or modules to provide workflow engines to clients. In some embodiments, workflow engine service 210 may implement a workflow generation/registration module 212. Workflow generation/registration module 212 may handle various client requests to register (e.g., submit already defined workflows or task performers) or create (e.g., provide various information to generate one or more workflows). For example, FIG. 3 is a block diagram illustrating interactions between a client and a workflow engine service to register a client-defined workflow and between a task performer and a workflow engine service, according to some embodiments.

Client 200 may be a system used by a developer, or other user of a workflow engine service in order to register, configure, and/or define a workflow to be managed by workflow engine service 210 (e.g., via API requests or graphical user interface provided by workflow engine service 210). Client 200 may be different from other clients 200, which may also be clients that are actors or resources (e.g., external workflow performance resources 230) that perform part of a workflow managed by workflow engine service 210. Client 200 may send a client-defined workflow registration request 310 to workflow engine service 210 (which may dispatch the request to workflow generation/registration module 212 for handling) to register a workflow. Such a workflow may already be defined according to a programming language, framework, or other definition mechanism for workflows. The workflow definition may, in some embodiments, include static task interfaces for workflow tasks which, as discussed above with regard to FIG. 1B, may be previously defined inputs and/or outputs provided to and sent from a task performing as part of a workflow. The client-defined workflow registration request 310 may also include various information about the workflow, such as identification information 312 (e.g., which may be workflow name, version, access controls, owner, etc. . . . ) and/or workflow task list 314, which may include the various tasks associated with a workflow. Workflow task list 314 may include workflow tasks that implement dynamic task discovery, as well as workflow tasks that are statically defined. In some embodiments, workflow engine service 210 is agnostic as to whether a workflow task implements dynamic task discovery, as it may appear (based on the dynamic task discovery module) that the task is statically defined even when it is not.

A task performer 300 may be an external resource 230 or provider resource 220 configured to perform various tasks. In various embodiments, a task performer may implement a static task definition and/or a dynamic task discovery module for tasks that the task performer is configured to perform. As noted above, a given task performer may perform multiple different tasks, may implement a static task definition for some, while for others a dynamic task discovery module may be implemented. In some embodiments, task performers, however, may be dedicated to performing a single type.

Task performer 300 may send a task performer registration request 320 (or send to polling requests to workflow engine service 210) to workflow engine service 210 in order to indicate that task performer 300 is available to perform tasks as part of executing the workflow. Task performer registration request 320 may include identification information 322 (e.g., network address, machine or instance name, various authentication or security credentials indicating permission to perform workflow tasks, etc. . . . ). Task performer registration request 320 may also include associated tasks 324 which the task performer 300 may be configured to perform. Task associations may include various task names, task types (e.g., activity or decision), as well as (in some embodiments) whether a task performer performs dynamic task discovery from some tasks.

Figure 4:
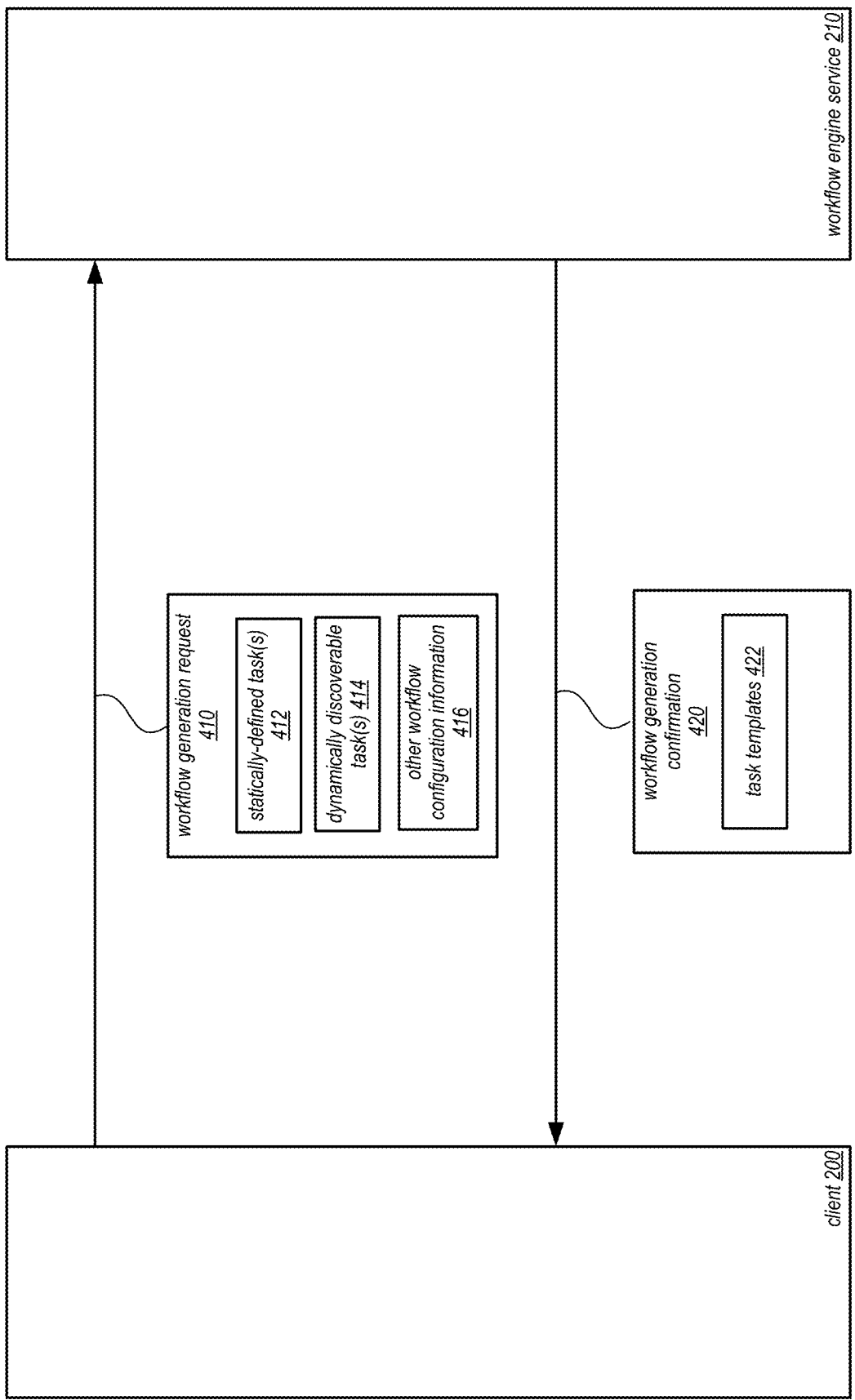
FIG. 4 is a block diagram illustrating interactions between a client and a workflow engine service to generate a workflow and tasks templates for the workflow, according to some embodiments.

In addition to registering previously defined workflow and task performers, clients 200 may also request the generation of workflows, such as may be constructed from various workflow libraries, templates, or according to information provided by client 200 to workflow engine service 210. FIG. 4 is a block diagram illustrating interactions between a client and a workflow engine service to generate a workflow and tasks templates for the workflow, according to some embodiments.

Client 200 may send a workflow generation request 410 to workflow engine service 210, in various embodiments. Workflow generation request 410 may include one or more statically defined tasks 412 to be included in a generated workflow. For example, statically defined tasks 412 may include identification, version, type, or other configuration information (e.g., such as static task interfaces) for the particular tasks 412. In some embodiments, the statically defined tasks 412 may be requests to implement task implementations from a library, or other store of task implementations maintained at workflow engine service 210. Alternatively, or additionally, in some embodiments, workflow generation request 410 may include one or more dynamically discoverable task(s) 414. Static interfaces may be defined (e.g., the input(s) and/or output(s)) for dynamically discoverable tasks as well as an indication of a particular type of task discovery module or mechanism (e.g., proxy code, data store location, etc. . . . ). In some embodiments, other workflow configuration information 416, such as the ordering of the identified tasks 412 and 414, common inputs, common configuration information (e.g., task timeouts, error handling, or other workflow configurations).

Figure 8:
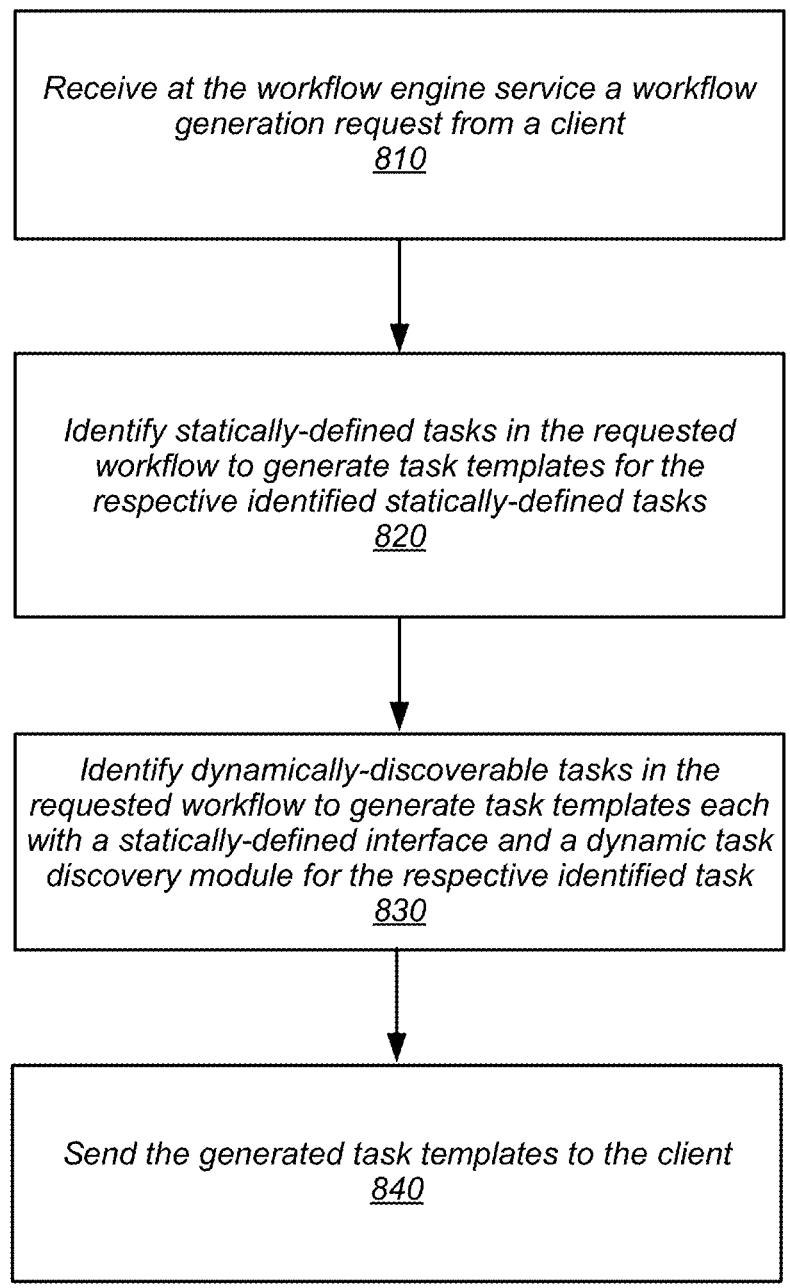
FIG. 8 is high-level flowchart illustrating various methods and techniques for generating workflow task templates for static and dynamically discoverable tasks, according to some embodiments.

In some embodiments, workflow engine service 210 may be configured to generate one or more task templates which may either be sent to a client 200 for implementation (as illustrated in FIG. 4) or may be populated by client 200 with further information and instantiated on one or more network provider resources 220 (e.g., virtual compute instances) to act as task performers for the generated workflow. Workflow generation confirmation 420 may be sent to client 200 to indicate successful creation of the workflow. Although not illustrated, requests for additional information, error messages, or other communications concerning the workflow generation request may be sent from workflow engine service 210 to client 200. In some embodiments, workflow generation confirmation 420 may include task templates 422 which may include individual task templates for each workflow task in the generated workflow (e.g., included executable code modules or source code for tasks in the workflow). Task templates 422 may then be modifiable by client 200 in some embodiments to implement on task performers. In some embodiments the tasks templates 422 may not need modification, but a dynamic task configuration manager may still set or modify dynamic task configuration data which dynamic task discovery modules included in task templates for tasks with dynamic discovery may use to discover task versions. FIG. 8, described in further detail below, discusses various methods and techniques for generating workflow task templates according to various embodiments, which may be implemented by workflow registration/generation 212 in workflow engine service 210. In some embodiments, workflow generation registration module 212 may also be configured to modify and/or delete registered/created workflows.

Turning back to FIG. 2, workflow engine service 210 may implement workflow execution management 214 to provide workflow management, coordination, orchestration, and or direction. Workflow execution management 214 may maintain state information for currently performing workflows, tracking workflow executions, retaining and ensuring consistency of execution history, and/or dispatching tasks to various task performers/workers. For example, in some embodiments, workflow execution management 214 may maintain activity lists and decisions which may track, queue, list, or otherwise maintain activity and decision tasks to be performed by task performers. In some embodiments, workflow execution management 214 may provision resources to perform tasks (e.g., request computing resources such as compute nodes or virtual instances) and/or balance task workload among different task performers for a workflow.

Workflow engine service 210 may implement a programmatic interface (e.g., an Application Programming Interface (API)) or a graphical interface (e.g., via a web site or a set of web pages) that allows clients 200, task performers, or other to perform various requests for creation/registration of workflows, starting, stopping, configuring or otherwise modifying execution of workflows. Workflow engine service 210 (or provider network 200) may also implement various client management features. For example, workflow engine service 210 may coordinate the metering and accounting of client usage of workflow engine service 210, such as by tracking the identities of requesting clients 200, the number and/or frequency of client requests, number of workflows executed, length of time workflows executed on behalf of clients 200, or any other measurable client usage parameter. Workflow engine service 210 may also implement financial accounting and billing systems, or may maintain a database of usage data that may be queried and processed by external systems for reporting and billing of client usage activity. In certain embodiments, workflow engine service 210 may be configured to collect, monitor and/or aggregate a variety of workflow engine service system operational metrics, such as metrics reflecting the rates and types of requests received from clients 200, bandwidth utilized by such requests, system component utilization (e.g., network bandwidth and/or resource utilization within the workflow engine service 210 to perform workflow), rates and types of errors resulting from requests, or any other suitable metrics. In some embodiments such metrics may be used by system administrators to tune and maintain system components, while in other embodiments such metrics (or relevant portions of such metrics) may be exposed to clients 200 to enable such clients to monitor their usage of workflow engine service 210.

In some embodiments, workflow engine service 210 may also implement user authentication and access control procedures. For example, for a given network-based services request to execute a particular workflow, platform 200 may be configured to ascertain whether the client 200 associated with the request is authorized to execute the particular workflow. Workflow engine service 210 may determine such authorization by, for example, evaluating an identity, password or other credential against credentials associated with the particular workflow (or account associated with multiple workflows), or evaluating the requested execution of the particular workflow against an execution control list for the particular workflow. For example, if a client 200 does not have sufficient credentials to execute the particular workflow, workflow engine service 210 may reject the corresponding network-based services request, for example by returning a response to the requesting client 200 indicating an error condition. Various execution control policies may be stored as records or lists of execution control information by workflow engine service 210.

In some embodiments provider network 200 may implement provider workflow performance resources 220. Provider resources may implement various types of compute or storage resources to perform workflow tasks. For example, computing resources, called "instances," such as virtual or physical compute instances may provide an execution environment or platform to perform workflow tasks, such as tasks with dynamic task discovery. A virtual compute instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor). A number of different types of computing devices may be used singly or in combination to implement the compute instances. In some embodiments clients 200 or may be provided direct access to a compute instance or other resource 220 to start, initiate, instantiate, upload, provision, or otherwise configure one or more resources 220 with code, executables, or other components to perform a workflow task. Compute instances may operate or implement a variety of different platforms for performing workflow tasks, such as application server instances, Java™ virtual machines (JVMs), general purpose or special-purpose operating systems, platforms that support various interpreted or compiled programming languages such as Ruby, Perl, Python, C, C++ and the like, or high-performance computing platforms) suitable for performing workflow tasks. As previously stated, dynamic task discovery may be implemented as part of tasks performed by provider workflow performance resources 220 and thus the techniques presented below with regard to FIGS. 7 and 8 may be performed by external workflow performance resources.

As noted above, in some embodiments, external workflow performance resources 230, such as client-owned/controlled computing resources (e.g., application servers), third-party computing resources (e.g., that host application components), data storage systems (e.g., databases), or any other external workflow resource for performing tasks for may also communicate with workflow engine service 210 in order to execute workflows. For example, in some embodiments, external workflow performance resources may perform various resource or decision tasks unbeknownst to users of task performance resources, such as mobile devices, web browsers, inventory scanners, or other devices implementing workflow tasks configured to communicate with workflow engine service 210. Dynamic task discovery may be implemented as part of tasks performed by workflow performance resources 230 and thus the techniques presented below with regard to FIGS. 7 and 8 may be performed by external workflow performance resources.

Figure 5:
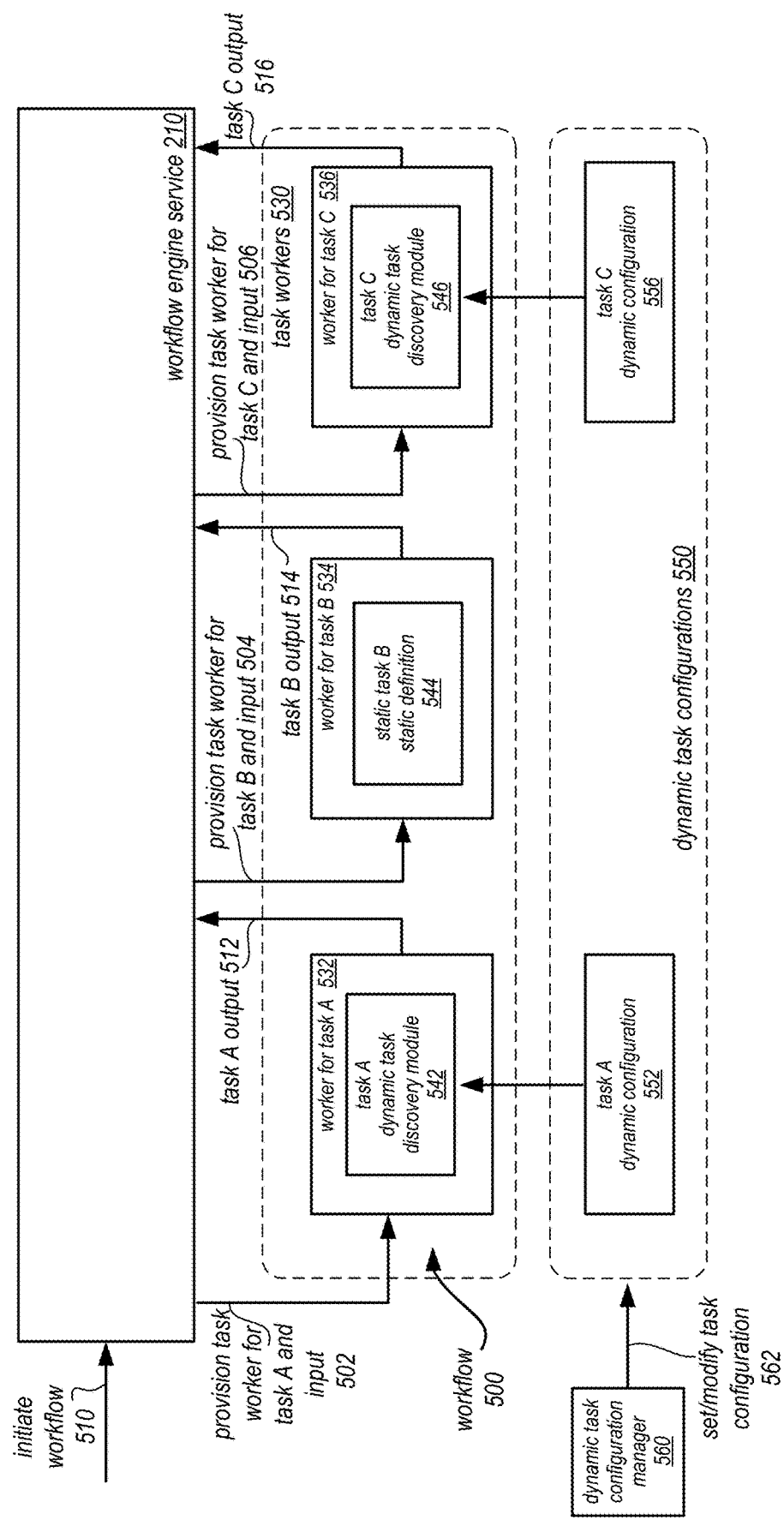
FIG. 5 is a block diagram illustrating a workflow engine service managing a workflow with dynamic task discovery, according to some embodiments.

FIG. 5 is a block diagram illustrating a workflow engine service managing a workflow with dynamic task discovery, according to some embodiments. Workflow engine service 210 may provide coordination, direction, and/or management of workflow 500, as illustrated in FIG. 5. Workflow 500 may include a mix of task types. Tasks A and C are dynamically discoverable, while task B is a statically defined task. Dynamic task configuration manager 560 may be a dynamic component that may set or modify 562 dynamic task configurations 550. Dynamic task configuration manager 560 may be implemented separately from dynamic task configurations in some embodiments (e.g., as a standalone component or system for an application provider) or may be implemented locally with dynamic task configurations 550 (e.g., implemented at task workers along with libraries, xml files, or other forms of dynamic task configurations). Dynamic task configuration manager 560 may make modifications to dynamic task configurations at runtime, on-the-fly, or as part of some application preprocessing that may occur before workflow execution begins. Dynamic task configuration manager 560 may implement various ones of the methods and techniques described below with regard to FIG. 7 detecting and modifying dynamic task configurations, in some embodiments. In some embodiments, dynamic task configuration manager may be utilized to manually modific task configurations (e.g., by a developer or system administrator).

As illustrated at 510, execution of the workflow may be initiated. A start request or similar request may be received at workflow engine service 210. Workflow engine service 210 may then provision a task worker for a first task of the workflow task A and provide input 502 to the provisioned task worker to perform task A. For example, in FIG. 5, task worker 532 may be provisioned by workflow engine service 210 to perform task A. Task worker 532 may have registered with workflow engine service 210 as configured to perform task A and may have also indicated availability to perform task A, in some embodiments. Task worker 532 for task A is configured to perform task A. Task A is a dynamically-discoverable task, and therefore task worker 532 implements task A dynamic task discovery module 542. Dynamic task discovery module 542 may be implemented using one of the various techniques discussed above with regard to FIG. 1, and below with regard to FIG. 6. Whether implementing proxy code or accessing a data store, dynamic task discovery module 542 may be configured to receive the input to perform the task, dynamically determine a task version for task A according to task A dynamic configuration 552, perform the determined task version upon the input 502, and send task A output 512 back to workflow engine service 210 to indicate completion of task A.

For task B, workflow service engine 210 provision a task worker 534 for task B and provide input 504 to the task worker 534 in order to perform the workflow task. Task B is a statically defined task. Task worker 534 may implement task B static definition 544 and perform task B accordingly on input 504. Task B output 514 may be sent from task worker 534 to workflow engine service 210 to indicate completion of task B.

For task C, workflow engine service 210 may again provision task worker 536 and provide input 506 to perform task C. Task worker 536 may implement task C dynamic task discovery module 546 which may discover the task version to perform according to task C dynamic configuration 556. Dynamic task discovery module 546 may then perform the task according to the task version and send generated task C output 516 to workflow engine service 210 to indicate completion of task C. Workflow engine service may track the performance of tasks A, B, and C for various executions of the workflow. Performance of these tasks may queued in tasks lists maintained at workflow engine service 210 which may then be dispatched to available task workers 530 which may be provisioned (and configured) to perform the various tasks. In some embodiments, tasks A, B, and C need not be performed linearly, or in order, but may be performed asynchronously and/or in parallel with other tasks. Some task workers 530 may perform different tasks (e.g., tasks A and C, or A and B) at the same time, in some e embodiments.

Figure 6:
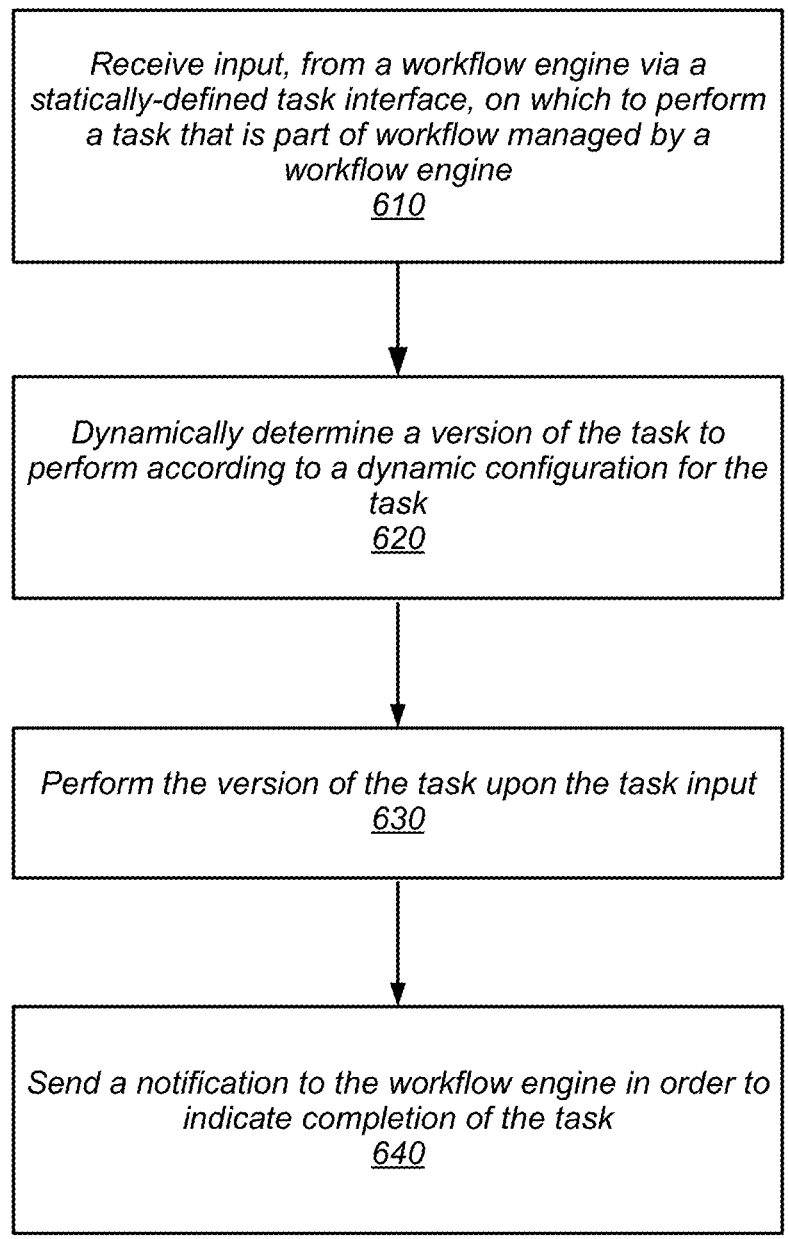
FIG. 6 is a high-level flowchart illustrating various methods and techniques for dynamic task discovery for workflow tasks, according to some embodiments.

The examples of a network-based workflow engine service configured to manage workflows with dynamically discover task configurations discussed above with regard to FIGS. 2-5 have been given in regard to a network-based workflow engine service. Various other types or combinations of systems may implement these techniques. For example, a workflow engine that is not a publicly available service may perform workflows with dynamically discoverable task configurations. FIG. 6 is a high-level flowchart illustrating various methods and techniques for dynamic task discovery for workflow tasks, according to some embodiments. These techniques may be implemented by task worker, performer, or application subsystem, or other component performing tasks that are part of a workflow performed by a workflow engine to implement an application service or functionality.

As indicated at 610, input is received via a statically-defined task interface on which to perform a particular task that is part of a workflow managed by workflow engine. Input may be one or more various values, objects, handles, parameters, references, pointers, or other information which may be used for performing the particular task, according to some embodiments. For example, input may be a string value naming a particular object upon which various configuration operations may be performed as part of a workflow task. In some embodiments, input may simply be a request to begin performing the workflow task.

As indicated at 620, a version of the particular task may be dynamically determined according to a dynamic configuration for the task. For example, a template, placeholder, shim, proxy code, inversion of control mechanism, or other component which may serve as place holder for a task until task runtime and may determine a version of the task to perform. Dynamic task configurations may, in some embodiments, dictate the mechanism or technique for dynamic task discovery. For example, if dynamic task configurations expose a code module or executable configured to perform a version of the particular task, then the dynamic determination of the task may be performed according some lookup or other technique accessing the dynamic task configuration locally (e.g., a pointer, reference, name or other indication of the code module in an XML or other data file), or in a separate storage location, such as a database system, which may be accessed via a network-based request. In another example, if a dynamic task configuration provides various values to be used when performing the particular task, then an inversion of control container may be implemented to load a code module with the respective values identified in the dynamic task configuration.

As discussed above, dynamic task configurations may be simply a pointer to a code module, executable or other component configured to perform the version of the task, such as by loading, invoking, or otherwise performing the task version. In some embodiments, dynamic task configurations may themselves be executables, modules, or other components configured to perform the version of the task. Dynamic task configurations may be stored/maintained/implemented along with different versions of the same task such as in a task version library, file, etc. . . . . . Alternatively, a single task version may be maintained or exposed for dynamic task discovery and may be set, modified, or reconfigured (e.g., by dynamic task configuration manager or other component) to expose a different single task version.

As indicated at 630, the particular task may be performed according to the determined version of the particular task, in some embodiments. For example, in some embodiments the dynamically determined task version may be a code module which may be loaded or invoked to perform the version of the task. Different task versions may be performed for the same task executed in the same workflow for different respective executions of the workflow. If, for instance, a workflow is executed and a task with dynamic task discovery is performed according to one task version, another execution of the same workflow and same task may result in the performance of a different version of the task. The dynamic task configuration for the particular task may have been modified on-the-fly so as perform a different task version. Task output may be sent, in some embodiments. A notification may be sent to the workflow engine in order to indicate that the particular task is complete, as indicated at 640.

Figure 7:
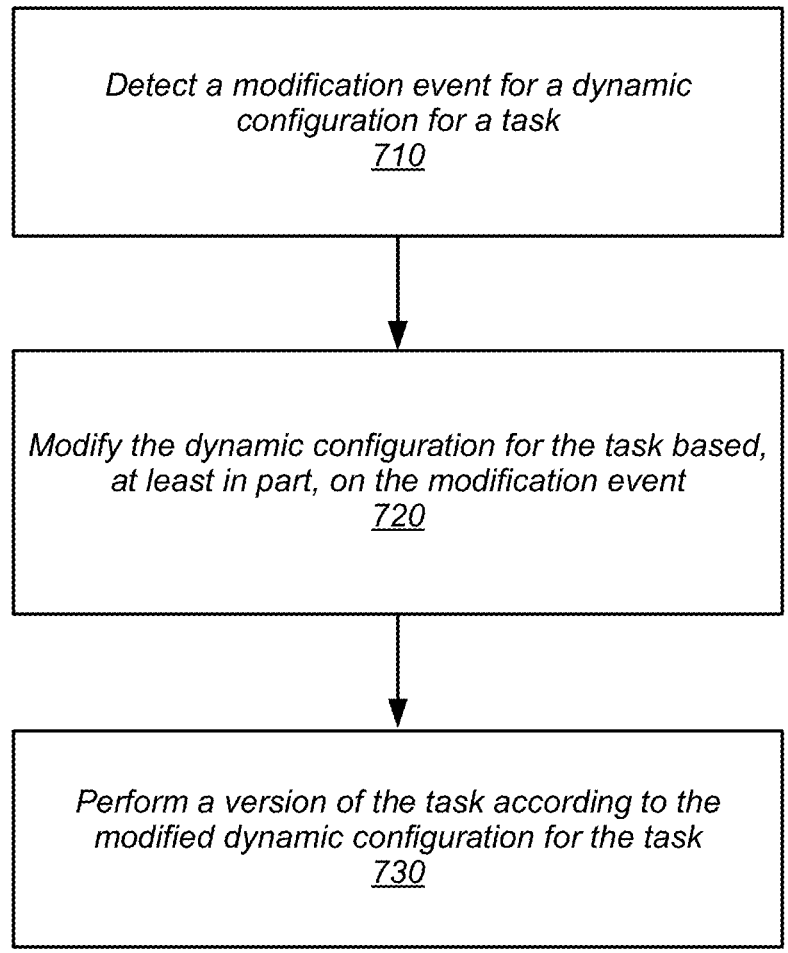
FIG. 7 is high-level flowchart illustrating various methods and techniques for setting or modifying configuration data for discoverable workflow task versions, according to some embodiments.

Dynamic task configurations may be configured, reconfigured, modified, set, deleted, or altered in many different ways. In some embodiments, dynamic task configurations may be created or modified prior to workflow execution. For example, an application component (e.g., implemented on a client 200, external resource 230, and/or provider resource 220 described above with regard to FIG. 2) may determine based on an application's performance state, user input, administrator information, etc. . . . that one or more task configurations for dynamically-discoverable tasks may be desired. A rules engine or selection component may identify dynamic task configurations to be changed and modify the identified task configurations into new dynamic task configurations. In some embodiments, dynamic task configurations may be determined at runtime or on-the-fly. FIG. 7 is high-level flowchart illustrating various methods and techniques for setting or modifying configuration data for discoverable workflow task versions, according to some embodiments.

A dynamic component, such as a dynamic task configuration manager implemented as part of an application and/or client for which a workflow is performed, may set, modify, alter, or reconfigure dynamic task configurations, in various embodiments. As indicated at 710, a modification event for a dynamic task configuration may be implemented, in some embodiments. A modification event may include detecting changes that render one or more task versions provided by a dynamic task configuration to be obsolete, erroneous, or unavailable. For example, if a particular dynamic task configuration utilizes a network-based service, resource, or other component that is no longer available (e.g., failed or ceased operation), then a new service, resource, or component may need to be identified in a new task version. A modification event for dynamic task configuration may also include detecting application performance changes (e.g., higher/lower workload), and adjust dynamic task configurations to provide task versions that compensate for the application performance changes (e.g., more/less resource intensive task implementations). Other modification events, such as user input, may trigger runtime or on-the-fly configuration of dynamic task configurations, and as such the previous examples are not intended to be limiting.

As indicated at 720, the dynamic configuration for the task may be modified based, at least in part, on the modification event, in various embodiments. As discussed in the examples above, modification of dynamic task configurations may correspond to remedy, counteract, account for, otherwise provide for the detected modification event. For example, if a modification event is detected that particular task is no longer necessary when executing a workflow in some instances, then the dynamic configuration for the task may be modified for those instances in order to perform a no operation (NOOP). Subsequently, in various embodiments, versions of the task may be identified and performed according to the modified dynamic configuration for the task, as indicated at 730. Thus the same task executed in the same workflow may performed different task versions.

In various embodiments, a workflow engine service may construct, generate, and/or assemble workflows to be managed by a workflow engine. FIG. 8 is a high-level flowchart illustrating various methods and techniques for generating workflow task templates for static and dynamically discoverable tasks, according to some embodiments. A workflow generation request may be received, as indicated at 810. The workflow generation request may be a request to generate a specific workflow based on one or more workflow templates provided by the workflow engine service. For example, the workflow creation request may indicate a selection of an workflow template, such as purchase authorization template, that may include common tasks performed to authorize network-based purchase (e.g., request credentials, verify credentials with an identification service, initiate payment using verified credentials, etc. . . . ). One or more of the tasks in the workflow template may be a dynamically discoverable task. For example, the verification of credentials step may be a dynamically discoverable task so that a particular application client may use different identification services dependent on the received credentials. In another example, the workflow generation request may include one or more identified tasks, some of which may be marked as statically-defined or dynamically discoverable. Various other information, such as configuration information for a workflow (e.g., task timeout settings, whether or not certain tasks may perform in parallel, error handling, etc. . . . ) may also be included in the generation request.

As indicated at 820, statically-defined tasks in the requested workflow may be identified in order to generate task templates for the statically-defined tasks, in various embodiments. Thus if, for instance, the statically defined tasks are described in a workflow template maintained by the workflow engine service, the task templates corresponding to the statically-defined task templates may be obtained from a template library or store. For tasks that are described (but not already generated in a task template) in the workflow creation request, a generic statically-defined template may be generated according to the descriptive information provided in the workflow generation request. For example, the workflow generation request may provide software model (such as UML) or other description to provide a static definition to include in the task template. Various code generation techniques may be applied to generate an executable or code module to perform the described static definition.

As indicated at 830, dynamically-discoverable tasks in the requested workflow may be identified in order to generate task templates each with a statically-defined interface and a dynamic task discovery module for the respective identified task, in various embodiments. Similar to the description above with regard to statically-defined tasks, a workflow generation request based on a provided workflow template may simply obtain workflow task template that includes a respective static interface (describing the input and/or output for the task) and dynamic task discovery module (e.g., proxy code or data store location) appropriate for the workflow task. In some embodiments, the static interface and/or dynamic task discovery module may be described in the workflow generation request, and then generated as a task template according to the received description.

In some embodiments, generated task templates may be viable task implementations that may be implemented by task workers for performing tasks for a corresponding workflow managed by the workflow engine service. For example, descriptive information provided in the workflow generation requested combined with a workflow template may be sufficient for the workflow engine service to provide task implementations to task workers in order to execute the workflow without further development or implementation of the workflow tasks by an application provider. In some embodiments, as indicated at 840, generated task templates may be sent to the requesting client. These generated task templates may be further configurable (e.g., the include source code which may be editable to include additional implementation details) or provide executable code modules which may be ready for implementation on computing resources for task performance.

The methods described herein may in various embodiments be implemented by any combination of hardware and software. For example, in one embodiment, the methods may be implemented by a computer system (e.g., a computer system as in FIG. 9) that includes one or more processors executing program instructions stored on a computer-readable storage medium coupled to the processors. The program instructions may be configured to implement the functionality described herein (e.g., the functionality of various servers and other components that implement the virtual computing resource provider described herein). The various methods as illustrated in the figures and described herein represent example embodiments of methods. The order of any method may be changed, and various elements may be added, reordered, combined, omitted, modified, etc.

Figure 9:
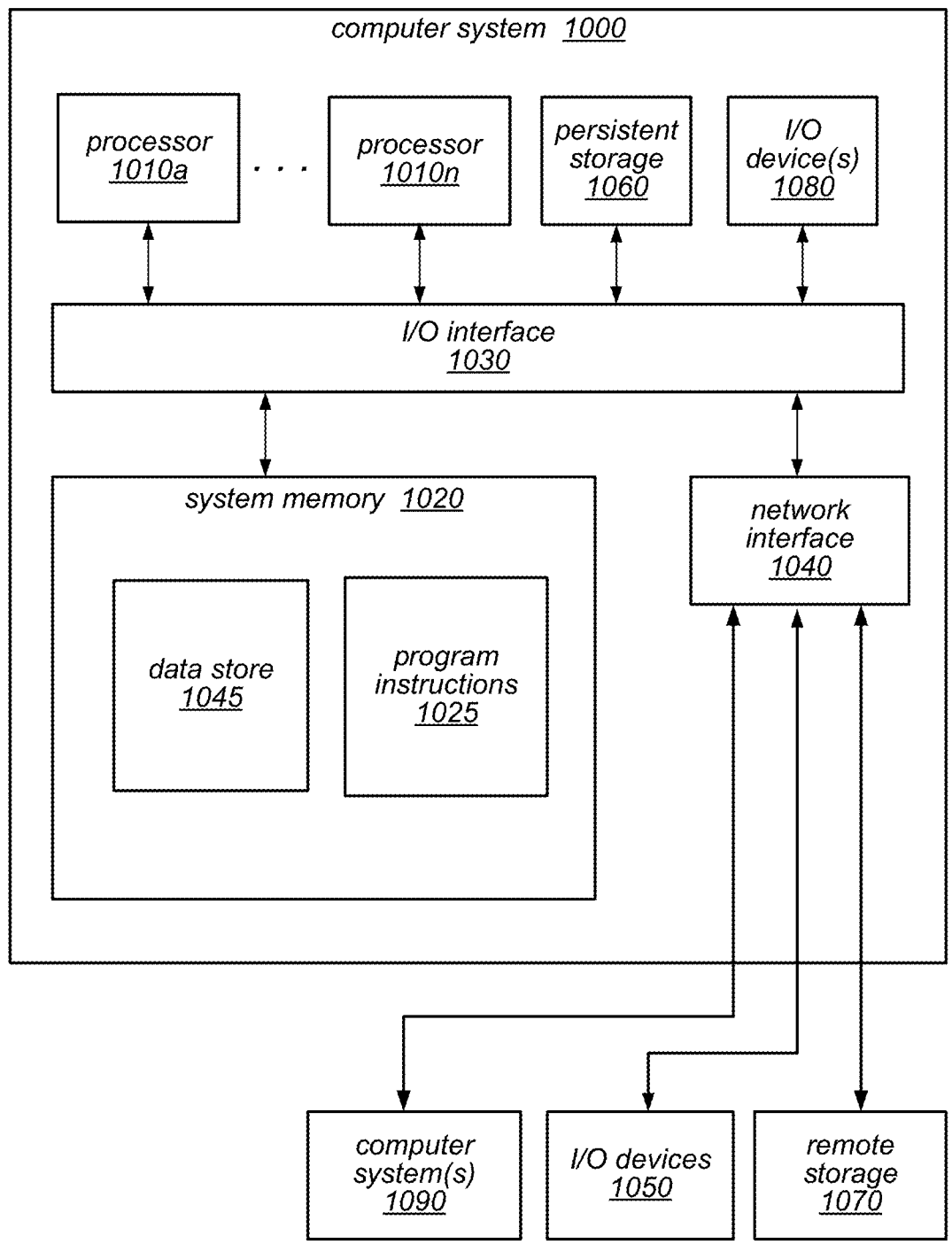
FIG. 9 is a block diagram illustrating an example computing system, according to some embodiments.

Embodiments of dynamic task discovery for workflow tasks as described herein may be executed on one or more computer systems, which may interact with various other devices. FIG. 9 is a block diagram illustrating an example computer system, according to various embodiments. For example, computer system 1000 may be configured to implement nodes of a compute cluster, a distributed key value data store, and/or a client, in different embodiments. Computer system 1000 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing device.

Computer system 1000 includes one or more processors 1010 (any of which may include multiple cores, which may be single or multi-threaded) coupled to a system memory 1020 via an input/output (I/O) interface 1030. Computer system 1000 further includes a network interface 1040 coupled to I/O interface 1030. In various embodiments, computer system 1000 may be a uniprocessor system including one processor 1010, or a multiprocessor system including several processors 1010 (e.g., two, four, eight, or another suitable number). Processors 1010 may be any suitable processors capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA. The computer system 1000 also includes one or more network communication devices (e.g., network interface 1040) for communicating with other systems and/or components over a communications network (e.g. Internet, LAN, etc.). For example, a client application executing on system 1000 may use network interface 1040 to communicate with a server application executing on a single server or on a cluster of servers that implement one or more of the components of the workflow engine described herein. In another example, an instance of a server application executing on computer system 1000 may use network interface 1040 to communicate with other instances of the server application (or another server application) that may be implemented on other computer systems (e.g., computer systems 1090).

In the illustrated embodiment, computer system 1000 also includes one or more persistent storage devices 1060 and/or one or more I/O devices 1080. In various embodiments, persistent storage devices 1060 may correspond to disk drives, tape drives, solid state memory, other mass storage devices, or any other persistent storage device. Computer system 1000 (or a distributed application or operating system operating thereon) may store instructions and/or data in persistent storage devices 1060, as desired, and may retrieve the stored instruction and/or data as needed. For example, in some embodiments, computer system 1000 may host a storage system server node, and persistent storage 1060 may include the SSDs attached to that server node.

Computer system 1000 includes one or more system memories 1020 that are configured to store instructions and data accessible by processor(s) 1010. In various embodiments, system memories 1020 may be implemented using any suitable memory technology, (e.g., one or more of cache, static random access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory). System memory 1020 may contain program instructions 1025 that are executable by processor(s) 1010 to implement the methods and techniques described herein. In various embodiments, program instructions 1025 may be encoded in platform native binary, any interpreted language such as Java™ byte-code, or in any other language such as C/C++, Java™, etc., or in any combination thereof. For example, in the illustrated embodiment, program instructions 1025 include program instructions executable to implement the functionality of a virtual computing resource provide network, in different embodiments. In some embodiments, program instructions 1025 may implement multiple separate clients, server nodes, and/or other components.

In some embodiments, program instructions 1025 may include instructions executable to implement an operating system (not shown), which may be any of various operating systems, such as UNIX, LINUX, Solaris™, MacOS™, Windows™, etc. Any or all of program instructions 1025 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 1000 via I/O interface 1030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 1000 as system memory 1020 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 1040.

In some embodiments, system memory 1020 may include data store 1045, which may be configured as described herein. In general, system memory 1020 (e.g., data store 1045 within system memory 1020), persistent storage 1060, and/or remote storage 1070 may store data blocks, replicas of data blocks, metadata associated with data blocks and/or their state, configuration information, and/or any other information usable in implementing the methods and techniques described herein.

In one embodiment, I/O interface 1030 may be configured to coordinate I/O traffic between processor 1010, system memory 1020 and any peripheral devices in the system, including through network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments, some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems 1090 (which may implement one or more storage system server nodes, database engine head nodes, and/or clients of the database systems described herein), for example. In addition, network interface 1040 may be configured to allow communication between computer system 1000 and various I/O devices 1050 and/or remote storage 1070. Input/output devices 1050 may, in some embodiments, include one or more display terminals, keyboards, keypads, touchpads, scanning devices, voice or optical recognition devices, or any other devices suitable for entering or retrieving data by one or more computer systems 1000. Multiple input/output devices 1050 may be present in computer system 1000 or may be distributed on various nodes of a distributed system that includes computer system 1000. In some embodiments, similar input/output devices may be separate from computer system 1000 and may interact with one or more nodes of a distributed system that includes computer system 1000 through a wired or wireless connection, such as over network interface 1040. Network interface 1040 may commonly support one or more wireless networking protocols (e.g., Wi-Fi/IEEE 802.11, or another wireless networking standard). However, in various embodiments, network interface 1040 may support communication via any suitable wired or wireless general data networks, such as other types of Ethernet networks, for example. Additionally, network interface 1040 may support communication via telecommunications/telephony networks such as analog voice networks or digital fiber communications networks, via storage area networks such as Fibre Channel SANs, or via any other suitable type of network and/or protocol. In various embodiments, computer system 1000 may include more, fewer, or different components than those illustrated in FIG. 9 (e.g., displays, video cards, audio cards, peripheral devices, other network interfaces such as an ATM interface, an Ethernet interface, a Frame Relay interface, etc.)

It is noted that any of the distributed system embodiments described herein, or any of their components, may be implemented as one or more network-based services. For example, a compute cluster within a computing service may present computing services and/or other types of services that employ the distributed computing systems described herein to clients as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the network-based service in a manner prescribed by the description of the network-based service's interface. For example, the network-based service may define various operations that other systems may invoke, and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a network-based services request, a network-based services client may assemble a message including the request and convey the message to an addressable endpoint (e.g., a Uniform Resource Locator (URL)) corresponding to the network-based service, using an Internet-based application layer transfer protocol such as Hypertext Transfer Protocol (HTTP).

In some embodiments, network-based services may be implemented using Representational State Transfer ("RESTful") techniques rather than message-based techniques. For example, a network-based service implemented according to a RESTful technique may be invoked through parameters included within an HTTP method such as PUT, GET, or DELETE, rather than encapsulated within a SOAP message.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

What is claimed is:

1. A system, comprising:
   one or more hardware processors with associated memory that implements a plurality of compute nodes, wherein at least some compute nodes implement a workflow engine configured to perform workflows for clients, configured to:
   receive, from a client, a definition of a particular task in a workflow that defines a statically-defined programmatic task interface of the particular task, wherein the statically-defined programmatic task interface defines input and output of the particular task;
   receive, from the client, a plurality of code modules that are invocable by the workflow engine via the statically-defined programmatic task interface, wherein the code modules implement a plurality of versions of the particular task that use the same input and output defined by the statically-defined programmatic task interface;
   receive a dynamic configuration for the particular task to be used to dynamically determine one of the plurality of versions of the particular task to perform at a runtime of the particular task;
   provision and configure one or more virtual machine instances executing on one or more physical hosts to act as task worker nodes to perform the workflow, including a task worker node configured to:
   implement the statically-defined programmatic task interface of the particular task;
   receive, from the workflow engine, input on which to perform the particular task, wherein the input is received via the statically-defined programmatic task interface of the particular task;
   dynamically load, at the runtime of the particular task and responsive to the input, a version of the plurality of versions of the particular task to perform, wherein the version of the particular task is determined via a dynamic task discovery module of the task worker node and according to the dynamic configuration for the particular task;
   perform the particular task using one of the one or more code modules corresponding to the determined version of the particular task; and
   send a notification to the workflow engine to indicate that the particular task is complete, wherein the notification is sent via the statically-defined programmatic task interface of the particular task.

2. The system of claim 1, further comprising:
   a data store that stores one or more dynamic configurations for the workflow;
   wherein to dynamically determine the version of the particular task to perform according to the dynamic configuration for the task, the dynamic task discovery module is configured to access the dynamic configuration for the particular task in the data store.

3. The system of claim 1, further comprising:
   a different compute node of the plurality of compute nodes implementing a task configuration manager, configured to:
   detect a modification event for the dynamic configuration for the particular task; and
   in response to detecting the modification event, modify the dynamic configuration for the particular task based, at least in part, on the modification event.

4. The system of claim 3, wherein the task worker node is further configured to:
   receive other input on which to perform the particular task from the workflow engine via the statically-defined task interface;
   dynamically determine, via the dynamic task discovery module, another version of the particular task to perform according to the modified dynamic configuration for the particular task, wherein the other version of the particular task is different from the version of the particular task;
   perform the particular task according to the determined other version of the particular task; and
   send another notification to the workflow engine in order to indicate that the particular task is complete.

5. A method, comprising:
   performing, by one or more computing devices:
      receiving, at a workflow engine, a definition of a particular task in a workflow to be managed by the workflow engine that defines a statically-defined programmatic task interface of the particular task, wherein the statically-defined programmatic task interface defines input and output of the particular task;
      receiving, at the workflow engine, a plurality of code modules that are invocable by the workflow engine via the statically-defined programmatic task interface, wherein the code modules implement a plurality of versions of the particular task that use the same input and output defined by the statically-defined programmatic task interface;
      receiving a dynamic configuration for the particular task to be used to dynamically determine one of the plurality of versions of the particular task to perform at a runtime of the particular task;
      provisioning and configuring a virtual machine instance executing a physical host to act as a task worker node to implement the statically-defined programmatic task interface;
      receiving, by the task worker node and from the workflow engine, input on which to perform the particular task as part of the workflow managed by the workflow engine, wherein the input is received via the statically-defined programmatic task interface of the particular task;
      dynamically loading at the runtime of the particular task, by a runtime task discovery module of task worker node and responsive to the input, a version of the plurality of versions of the particular task to perform, wherein the version of the particular task is determined according to the dynamic configuration for the particular task;
      performing the particular task using one of the one or more code modules corresponding to the determined version of the particular task; and
      sending a notification to the workflow engine to indicate that the particular task is complete, wherein the notification is sent via the statically-defined programmatic task interface of the particular task.

6. The method of claim 5, wherein the dynamic configuration identifies a particular task execution module configured to perform the version of the particular task, and wherein said dynamically determining the version of the particular task to perform according to the dynamic configuration for the particular task, comprises:
   accessing a local dynamic configuration in order to identify the particular task execution module, wherein the particular task execution module is one out of a plurality of task execution modules corresponding to other versions of the particular task; and
   loading the particular task execution module in order to perform the particular task.

7. The method of claim 5, wherein the dynamic configuration identifies a particular task execution module configured to perform the version of the particular task, and wherein said dynamically determining the version of the particular task to perform according to the dynamic configuration for the particular task, comprises:
   accessing the dynamic configuration from a database maintaining dynamic configurations for the particular task; and
   loading the particular task execution module in order to perform the particular task.

8. The method of claim 5, further comprising:
   detecting a modification event for the dynamic configuration for the particular task; and
   in response to detecting the modification event, modifying the dynamic configuration for the particular task based, at least in part, on the modification event.

9. The method of claim 8, further comprising:
   receiving other input on which to perform the particular task from the workflow engine wherein the other input is received via the same statically-defined task interface of the particular task;
   dynamically determining another version of the particular task to perform according to the modified dynamic configuration for the particular task, wherein the other version of the particular task is different from the version of the particular task;
   performing the particular task according to the determined other version of the particular task; and
   sending another notification to the workflow engine in order to indicate that the particular task is complete.

10. The method of claim 5, wherein the workflow engine assigns different tasks of the workflow to different ones of a plurality of task worker nodes, and wherein the method further comprises performing, by another one of the plurality of task worker nodes:
   receiving other input from the workflow engine on which to perform a different task as part of the workflow, wherein the other input is received via a different statically-defined task interface of the different task;
   performing the different task according to a statically defined version of the different task; and
   sending another notification to the workflow engine in order to indicate that the different task is complete.

11. The method of claim 5, wherein the workflow engine is a network-based workflow engine service that is configured to manage the performance of a plurality of different workflows including the workflow for a plurality of different clients.

12. The method of claim 11, wherein the network-based workflow engine service is implemented as part of a network-based services provider, wherein a virtual computing resource provider is also implemented as part of the network-based services provider to provision the virtual machine instance.

13. The method of claim 11, further comprising:
   sending, from a client of the network-based workflow engine service, a workflow generation request, wherein the request includes a plurality of tasks including the particular task to be performed as part of the workflow; and receiving, at the client, a plurality of task templates corresponding to the plurality of tasks including the particular task to be performed, wherein each task template includes a respective statically-defined interface of the corresponding task, and wherein a task template for the particular task includes the runtime task discovery module that is configured to perform said receiving the input, said dynamically determining the task, said performing the particular task, and said sending the notification.

14. A non-transitory, computer-readable storage medium, storing program instructions that when executed by one or more computing devices cause the one or more computing devices to implement:
receiving a statically-defined programmatic task interface of a particular task defined for a workflow at a workflow engine, wherein the statically-defined programmatic task interface defines input and output of the particular task;
receiving a plurality of code modules that are invocable by the workflow engine via the statically-defined programmatic task interface, wherein the code modules implement a plurality of versions of the particular task that use the same input and output defined by the statically-defined programmatic task interface;
receiving a dynamic configuration for the particular task to be used to dynamically determine one of the plurality of versions of the particular task to perform at a runtime of the particular task;
causing a virtual machine instance to be provisioned and configured to execute a physical host to act as a task worker node to implement the statically-defined programmatic task interface, wherein the task worker node is configured to perform:
receiving, from the workflow engine, input on which to perform the particular task as part of the workflow managed by the workflow engine, wherein the input is received via the statically-defined programmatic task interface of the particular task;
dynamically loading at the runtime of the particular task, by a runtime task discovery module and responsive to the input, a version of the plurality of versions of the particular task to perform, wherein the version of the particular task is determined according to the dynamic configuration for the particular task;
performing the particular task using one of the one or more code modules corresponding to the determined version of the particular task; and
sending a notification to the workflow engine to indicate that the particular task is complete, wherein the notification is sent via the statically-defined programmatic task interface of the particular task.

15. The non-transitory, computer-readable storage medium of claim 14, wherein the dynamic configuration identifies a particular task execution module configured to perform the version of the particular task, and wherein the program instructions further cause the one or more computing devices to configure the task worker node to implement:
performing said dynamically determining of the version of the particular task to perform according to the dynamic configuration for the particular task;
accessing the dynamic configuration in a database maintaining dynamic configurations for the particular task; and
loading the particular task execution module in order to perform the particular task.

16. The non-transitory, computer-readable storage medium of claim 14, wherein the program instructions further cause the one or more computing devices to implement:
detecting a modification event for the dynamic configuration for the particular task; and
in response to detecting the modification event, modifying the dynamic configuration for the particular task based, at least in part, on the modification event.

17. The non-transitory, computer-readable storage medium of claim 16, wherein the program instructions further cause the one or more computing devices to configure the task worker node to implement:
receiving other input on which to perform the particular task from the workflow engine wherein the other input is received via the same statically-defined task interface of the particular task;
dynamically determining another version of the particular task to perform according to the modified dynamic configuration for the particular task, wherein the other version of the particular task is different from the version of the particular task;
performing the particular task according to the determined other version of the particular task; and
sending another notification to the workflow engine in order to indicate that the particular task is complete.

18. The non-transitory, computer-readable storage medium of claim 17, wherein performing the particular task according to the determined other version of the particular task performs a no operation (NOOP).

19. The non-transitory, computer-readable storage medium of claim 14, wherein the workflow engine is a network-based workflow engine service that is configured to manage the performance of a plurality of different workflows including the workflow for a plurality of different clients.

20. The non-transitory, computer-readable storage medium of claim 19, wherein the program instructions further cause the one or more computing devices to configure the task worker node to implement a dynamic task discovery module, and wherein the dynamic task discovery module was included in a task template for the particular task of the workflow provided to a client of the network-based workflow engine service from the network-based workflow engine service.

* * * * *